United States Patent
Kruse (10) Patent No.: US 10,902,758 B2
(45) Date of Patent: Jan. 26, 2021

(54) ILLUMINANT

(71) Applicant: Singulus Technologies AG, Kahl am Main (DE)

(72) Inventor: Kilian Kruse, Seligenstadt (DE)

(73) Assignee: Singulus Technologies AG, Kahl am Main (DE)

( * ) Notice: Subject to any disclaimer, the term of this patent is extended or adjusted under 35 U.S.C. 154(b) by 0 days.

(21) Appl. No.: 16/498,094

(22) PCT Filed: Mar. 23, 2018

(86) PCT No.: PCT/EP2018/057407
§ 371 (c)(1),
(2) Date: Jan. 13, 2020

(87) PCT Pub. No.: WO2018/177911
PCT Pub. Date: Oct. 4, 2018

(65) Prior Publication Data
US 2020/0143715 A1    May 7, 2020

(30) Foreign Application Priority Data
Mar. 29, 2017  (DE) .......................... 10 2017 003 036

(51) Int. Cl.
  *G09F 13/08* (2006.01)
  *F21V 8/00* (2006.01)
  *G09F 13/18* (2006.01)

(52) U.S. Cl.
  CPC ............. *G09F 13/08* (2013.01); *G02B 6/006* (2013.01); *G09F 13/18* (2013.01); *G09F 2013/1863* (2013.01)

(58) Field of Classification Search
  None
  See application file for complete search history.

(56) References Cited

U.S. PATENT DOCUMENTS

| 3,739,512 | A  | * | 6/1973  | Ruppert ................... G01P 1/08    |
|           |    |   |         | 40/546                                   |
| 6,827,456 | B2 | * | 12/2004 | Parker ............... G02F 1/133555     |
|           |    |   |         | 362/629                                  |
| 7,360,939 | B2 | * | 4/2008  | Sugiura ................ G02B 6/0036     |
|           |    |   |         | 349/57                                   |

(Continued)

FOREIGN PATENT DOCUMENTS

DE    201 05 140 U1    7/2001
DE    101 14 588 A1   10/2002
(Continued)

*Primary Examiner* — Elmito Breval
(74) *Attorney, Agent, or Firm* — Ohlandt, Greeley, Ruggiero & Perle, L.L.P.

(57) ABSTRACT

An illuminant comprising a transparent substrate layer with a first index of refraction, a connecting layer with a second index of refraction that differs from the first index of refraction, and a metallic, translucent layer, wherein the connecting layer is arranged between the substrate layer and the metallic layer, and wherein on the side facing the connecting layer the substrate layer comprises a plurality of decoupling structures suitable for decoupling light that propagates within the substrate layer from the substrate layer in the direction towards the metallic layer.

23 Claims, 5 Drawing Sheets

(56) References Cited

U.S. PATENT DOCUMENTS

| | | | |
|---|---|---|---|
| 7,806,539 B2* | 10/2010 | Parker | G02B 6/0021 |
| | | | 362/19 |
| 7,810,982 B2* | 10/2010 | Parker | A61M 21/02 |
| | | | 349/65 |
| 8,398,274 B2* | 3/2013 | Parker | G02B 27/00 |
| | | | 362/339 |
| 8,690,373 B2* | 4/2014 | Epstein | G02F 1/133606 |
| | | | 349/64 |
| 8,789,989 B2 | 6/2014 | Demma | |
| 9,140,831 B2* | 9/2015 | Kuroda | G02B 5/0231 |
| 10,073,210 B2* | 9/2018 | Jang | G02B 6/0055 |
| 10,338,297 B2* | 7/2019 | Jang | F21S 43/249 |
| 10,520,162 B2* | 12/2019 | Nakamura | G02B 3/0062 |
| 2005/0072032 A1* | 4/2005 | McCollum | G02B 6/002 |
| | | | 40/546 |
| 2008/0066355 A1 | 3/2008 | Misawa | |
| 2009/0286072 A1 | 11/2009 | Küchler et al. | |
| 2012/0015157 A1* | 1/2012 | Chen | H04M 1/22 |
| | | | 428/195.1 |
| 2012/0045859 A1* | 2/2012 | Namata | G02F 1/133621 |
| | | | 438/30 |
| 2012/0268687 A1* | 10/2012 | Kaida | B32B 27/08 |
| | | | 349/61 |
| 2012/0287677 A1* | 11/2012 | Wheatley | G02B 6/0053 |
| | | | 362/627 |
| 2013/0118047 A1 | 5/2013 | Buddenhagen et al. | |
| 2014/0104878 A1* | 4/2014 | Chen | G02B 6/0053 |
| | | | 362/611 |
| 2015/0184829 A1* | 7/2015 | Baek | F21S 43/249 |
| | | | 362/235 |
| 2015/0185401 A1* | 7/2015 | Kim | B60Q 3/64 |
| | | | 362/612 |
| 2016/0288704 A1 | 10/2016 | Kirilenko et al. | |
| 2019/0016086 A1* | 1/2019 | Solomon | B32B 27/38 |

FOREIGN PATENT DOCUMENTS

| | | |
|---|---|---|
| DE | 10114588 A * | 10/2002 |
| DE | 10 2004 060 453 A1 | 6/2006 |
| DE | 69932233 T2 | 6/2007 |
| DE | 10 2006 044 813 A1 | 4/2008 |
| DE | 102006055971 A1 | 6/2008 |
| DE | 112008002039 A5 | 4/2010 |
| DE | 102011016429 A1 | 10/2012 |
| DE | 102013223244 A1 | 5/2015 |
| DE | 10 2015 208 981 A1 | 11/2016 |
| DE | 10 2015 212 885 A1 | 1/2017 |
| EP | 1390936 A1 | 2/2004 |
| EP | 1058227 B1 | 7/2006 |
| EP | 2068180 A1 | 3/2008 |
| EP | 3 115 851 A1 | 1/2017 |
| FR | 2 908 502 A1 | 5/2008 |
| WO | 2002/089101 A1 | 11/2002 |
| WO | 2008/090507 A1 | 7/2008 |

* cited by examiner

ILLUMINANT

BACKGROUND

1. Field of the Disclosure

The present disclosure relates to an illuminant with metallic luster, and a method for producing such illuminant.

2. Discussion of the Background Art

In a wide variety of application fields, different illuminants are used to display information in the dark or mark structures by means of light. In many cases, however, it is not desired to have information displayed and/or marked permanently (e.g., under daylight conditions). Then, however, the means by which luminous information is displayed are usually still visible or discernible, which may impair the function of the respective product and/or have a disadvantageous effect on its aesthetics/appearance.

To this end, DE 101 14 588 A1 and DE 201 05 140 U1, for instance, disclose a backlit plastic component for display and/or function setting elements, said component consisting of transparent plastic material and being vapor coated with a thin metallic layer, wherein one or more punctiform or surface-illuminating illuminants are provided behind or within the plastic material so that diffuse light emerges through the metal layer to the front. Display symbols which set apart from the metallic coating by means of the backlight may be coated onto or brought into the metallic layer by a coating in a different color or by laser structuring or printing technology. Such display symbols are, however, visible under daylight conditions so that the viewer or user of the backlit plastic component does not get a homogeneous impression of the metallic layer.

DE 10 2015 208 981 A1 describes an element for a luminaire having a base which at least in sections comprises a coating comprising an inner side of the layer pointing to the base and an outer side of the layer pointing away from the base. The base is transparent, and light may radiate through the coating from the inner side of the layer. From the outer side of the layer, the coating is at least partially reflective and preferably reflects metallically and/or lustrously. In this case, the pattern distinguished by light is formed by the overall structure of the base. Thus, said pattern is discernible also without illumination.

DE 10 2004 060 453 A1 describes a multilayer laminar plastic component for decorative elements and/or functional elements made of a transparent support structure with layers applied thereto. On a first side of the support structure, an optically active layer is applied at least in subsections, said layer being assigned an aperture that prevents translucence in subsections and that can be backlit with a light source. Structures may be introduced into the optically active layer, thus creating different light transmission properties of the layer relative to the surface. Also in this case, however, the optically active layer is visible through the transparent support structure so that these structures remain visible also without backlight.

DE 10 2006 044 813 A1 also describes a lighting component. Documents DE 10 2015 212 885 A1 and EP 3 115 851 A1 describe a method for producing a hologram.

It is thus an object of the present disclosure to provide an improved illuminant as well as an improved method for producing an illuminant which both take into account the disadvantages described above. It is particularly an object of the present disclosure to provide an illuminant (as well as a method for producing the same) with which information and/or patterns made of light may be created in a simple manner and which appears optically homogeneous and appealing under daylight conditions.

SUMMARY

Accordingly, the present disclosure relates to an illuminant comprising a transparent substrate layer with a first index of refraction, a connecting layer with a second index of refraction that differs from the first index of refraction, and a metallic, translucent layer. The connecting layer is arranged between the substrate layer and the metallic layer. On the side facing the connecting layer, the substrate layer comprises a plurality of decoupling structures suitable for decoupling light that propagates within the substrate layer from the substrate layer in the direction towards the metallic layer.

Inter alia, the disclosure is based on the idea that the lighting information results from the arrangement of the decoupling structures in the connecting layer, wherein the light escaping from the decoupling structures can be noticed through the metallic, translucent layer. If, however, no light is decoupled from the decoupling structures, the metallic, translucent layer is noticed as a homogeneous surface without the structuring that is necessary for the lighting information attracting attention to the user.

To this end, the transparent substrate layer may be made of any material that is sufficiently transparent. Preferably, the transparent substrate layer is made of a transparent plastic material such as, e.g., PMMA, PETA, PC, ABS, or nylon.

In the context of the present disclosure, the terms "transparent" and "translucent" relate to the portion of the electromagnetic spectrum that is visible to the human eye, i.e., to wavelengths between 380 nm and 780 nm (in the following also referred to as "light spectrum"). Accordingly, the substrate layer is transparent preferably within the whole light spectrum. However, embodiments in which the substrate layer is transparent only in a wavelength interval within the light spectrum are conceivable too. If, for instance, a red light-emitting diode is employed, it is basically sufficient when the substrate layer is transparent over the emission band of the light-emitting diode. The same applies for the metallic, translucent layer, which in such case basically has to be translucent only within the red wavelength range too. When it comes to using the illuminant according to the present disclosure in an utmost versatile way, however, it is preferred that the substrate layer is transparent over the complete light spectrum.

Within at least one wavelength interval of the light spectrum and preferably over the complete light spectrum, the transmission factor of the substrate layer is preferably greater than 60%, preferably greater than 70%, and particularly preferably greater than 80%.

Within at least one wavelength interval of the light spectrum and preferably over the complete light spectrum, the transmission factor of the connecting layer is preferably greater than 60%, preferably greater than 70%, and particularly preferably greater than 80%.

Preferably over a wavelength interval within the light spectrum and preferably over the complete light spectrum, the metallic, translucent layer has a transmission factor of at least 40%, preferably of at least 60%, and particularly preferably of at least 80%. To this end, the transmission factor of the metallic, translucent layer may be controlled by the selection of the material on the one hand and the layer thickness on the other hand. Preferably, the thickness of the metallic, translucent layer is between 2 nm and 40 nm, more preferably between 10 nm and 30 nm, and particularly preferably between 12 nm and 20 nm. The following materials come into particular consideration for the metallic, translucent layer: aluminum, chromium, titanium, stainless steel, copper, gold, silver, and alloys of AlCu, AlMg, AlCu. A metallic, translucent layer having a corresponding layer thickness and sufficient homogeneity can be produced, for instance, by means of physical vapor deposition. With respect to achieving utmost homogeneity of the metallic, translucent layer, sputtering is a particularly preferred method. Preferably, the layer thickness homogeneity of the layer is at most ±5%, more preferably at most ±3%, and particularly preferably at most ±2%. A person skilled in the art is familiar with measuring methods for determining layer thickness homogeneity. For instance, layer thickness homogeneity can be determined by means of photometric transmission and reflection measurements (e.g., using the device ARGUS XE by the firm Dr. Schwab).

The side of the metallic, translucent layer which faces away from the connecting layer is preferably planar or smooth enough for the illuminant to appear with metallic luster. Preferably, the surface roughness of the metallic, translucent layer on the side facing away from the connecting layer is at most 5 µm, preferably at most 4 µm, and particularly preferably at most 3.5 µm. The skilled person is familiar with measuring methods for determining the surface roughness. For instance, the surface roughness can be determined, e.g., with tactile technologies (e.g., by means of portable measuring instruments with skidded gages or high-grade stationary stylus instruments with skidless gages) or noncontact systems (e.g., by means of confocal techniques).

Between the transparent substrate layer and the metallic, translucent layer there is a connecting layer with a second index of refraction which differs from the first index of refraction and is preferably smaller than the first index of refraction. It is further preferred that the second index of refraction differs from the index of refraction of air under standard conditions. Preferably, the second index of refraction (measured under standard conditions over the complete light spectrum) is greater than 1.0003, more preferably greater than 1.0005, even more preferably greater than 1.001, and most preferably greater than 1.002. In general, the connecting layer may comprise any material as long as difference in the index of refraction is guaranteed, which is to make sure that light propagating within the substrate layer is reflected as completely as possible at the interface between the transparent substrate layer and the connecting layer, and that light may essentially only escape from the transparent substrate layer via the decoupling structures. Further, the material of the connecting layer is to be suitable for permanently connecting the transparent substrate layer with the metallic, translucent layer. Preferably, the connecting layer is made of cured lacquer. Thermosetting or solvent-containing lacquers are generally suitable for this purpose. A connecting layer made of UV-cured lacquer is, however, particularly preferred.

On the one hand, the connecting layer serves for connecting the metallic, translucent layer with the transparent substrate layer. Preferably, the side of the connecting layer facing the metallic, translucent layer is formed in a planar manner in order to simplify the coating with the metallic, translucent layer and/or improve the homogeneity of the metallic, translucent layer. On the other hand, the connecting layer serves for compensating any unevenness caused by the decoupling structures in the transparent substrate layer, as will be explained in more detail below.

On the side facing the connecting layer, the substrate layer comprises a plurality of decoupling structures suitable for decoupling from the substrate layer light that propagates within the substrate layer in the direction of the metallic layer. In other words, regions are provided in the substrate layer in which the conditions for total (internal) reflection for light propagating within the substrate layer are interrupted. Preferably, these decoupling structures are formed as cavities and/or recesses in the substrate layer. Basically, these cavities and/or recesses may have any desired shape. However, it is particularly preferred to provide cone-shaped cavities and/or recesses in the substrate layer. These cavities are preferably at least partially and particularly preferably completely filled with the material of the connecting layer. In this way, a planar surface is provided for subsequent coating with the metallic, translucent layer. Otherwise, the metallic, translucent layer would expand into the cavities, which could lead to said cavities and/or recesses remaining visible.

The illuminant according to the disclosure may further comprise a protective layer applied to the metallic layer. Also for this purpose, any protective lacquer generally comes into consideration. However, the use of UV-cured protective lacquers is particularly preferred. The protective layer may be transparent and colorless or colored in order to affect the color impression of the illuminant in daylight on the one hand and the color impression of the decoupled light on the other hand.

Further, the substrate layer may comprise at least one coupling structure suitable for coupling light into the substrate layer from outside. Particularly preferably, one or more front ends of the substrate layer serve as coupling structures. In this manner, light may be coupled into the substrate layer at the correct angle in a particularly simple way. Alternatively or in addition, however, one or more coupling structures are possible at the side of the transparent substrate layer facing away from the connecting layer too.

Preferably, the difference between the first index of refraction and the second index of refraction is at least 0.02, more preferably at least 0.03, and particularly preferably at least 0.04. Under standard conditions, the respective difference in the index of refraction is preferably achieved over the complete light spectrum.

With respect to the decoupling structures, both the connecting layer and the metallic, translucent layer are configured such that the decoupling structures are not discernible to the naked eye when no light is decoupled from the decoupling structures, and that light decoupled from the decoupling structures is discernible to the naked eye through the metallic layer when light with a luminous intensity of 50 candela is coupled into the substrate layer. This may be achieved, e.g., by filling and/or covering the decoupling structures with the material of the connecting layer such that the bounding surface between the connecting layer and the metallic, translucent layer is essentially planar and homogeneous. Further, it is preferred for this purpose that the metallic, translucent layer forms an at least partially reflective layer to the outside (and/or to the protective layer). Preferably, the reflectivity of the metallic, translucent layer is at least 50%, more preferably at least 40%, and particularly preferably at least 30% over the complete light spectrum.

Preferably, the decoupling structures are formed on the substrate layer in a predetermined arrangement or a predetermined pattern so that the entirety of the light spots formed by the decoupling structures displays a desired piece of information or a desired image. In this context, the pattern may be formed by the arrangement and density of identical decoupling structures. Alternatively, decoupling structures of different shapes and/or dimensions may be present.

The illuminant according to the disclosure may generally comprise any three-dimensional shape and may form, e.g., a polyhedron, a convex body, or a body of rotation. In case an actually three-dimensional shape is concerned (and not a planar illuminant having a particular thickness), the illuminant preferably forms some kind of sheath, wherein the metallic, translucent layer (and, if need be, the protective layer applied thereto) of the illuminant forms an illuminant surface. In other words, it is preferred that at least one part of the outer surface of the three-dimensional illuminant is formed by the metallic, translucent layer (and, if need be, the protective layer applied thereto).

Preferably, the transparent substrate layer, the connecting layer, and the metallic, translucent layer are at least in sections curved and/or angled. To this end, the radius of curvature of the circle of curvature of the curved section of the metallic, translucent layer is at least in sections smaller than 1 m, preferably smaller than 50 cm, more preferably smaller than 30 cm, and particularly preferably smaller than 20 cm. In other words, it is preferred that the illuminant forms a three-dimensional body whose outer surface, which is formed as an illuminant surface by the metallic, translucent layer (and, if need be, the protective layer applied thereto), is at least in sections curved and/or angled.

According to a particularly preferred embodiment, the illuminant and particularly its transparent substrate layer at least in sections define an interior space. In this case, the substrate layer preferably comprises a plurality of coupling structures which are arranged on the side facing away from the connecting layer and which are suitable for coupling light from the interior space (but from the outside of the substrate layer) into the substrate layer. In this case, a light source arranged in the interior space by means of which light may be coupled into the substrate layer is particularly preferably provided.

The illuminant according to the disclosure may basically be made use of in any kind of application areas. The use of the illuminant according to the disclosure is preferred in the following products: packaging, containers, illuminated center consoles of vehicles, gearshift levers of vehicles, surfaces of electronic devices such as, e.g., personal computers, laptops, notepads, smartphones, ballpoint pens, light switches and/or light switch covers; domestic appliances such as, e.g., coffee machines.

For this purpose, the illuminant may generally assume any kind of shape. Preferably, the shape of the illuminant is defined by the transparent substrate layer. Particularly preferably, the transparent substrate layer is configured in a planar manner and has an essentially constant thickness that preferably lies in the range between 0.5 mm and 20 mm, more preferably between 1 mm and 10 mm, and particularly preferably between 2 mm and 6 mm. However, as already explained above, the transparent substrate layer may also be curved and/or form a three-dimensional hollow body (for example, a packaging or a container).

The present disclosure further relates to a packaging or a container with an illuminant as described above. In this context, at least one outer surface of the packaging or the container comprises the illuminant or is formed by the illuminant. The packaging or the container preferably further comprises a light source which is suitable for coupling light into the substrate layer of the illuminant. Preferably, the light source consists of one or more light-emitting diodes. Preferably, the packaging or the container further comprises a control that switches on and/or off the light source under predetermined conditions. For example, the control may be provided with a light sensor and programmed such that the light source is switched on in the dark only. Alternatively or additionally, a mechanism switching on the light source when, e.g., the packaging or the container is opened may also be provided. For instance, a part of the outer surface (or the complete outer surface) of a lipstick packaging (or a lipstick container) could be provided with the illuminant according to the disclosure, so that the packaging appears to have a metallic luster under the effect of external light in the first place. When the lipstick is being opened and used, the light source could then be activated, thus making the lipstick tube illuminate and/or display a certain logo.

The present disclosure further relates to a method for producing an illuminant, particularly an illuminant as described above. As per the method according to the disclosure, at first a transparent substrate layer is provided with a first index of refraction, wherein on a first side the substrate layer comprises a plurality of decoupling structures suitable for decoupling light that propagates within the substrate layer from the substrate layer. Subsequently, the first side of the substrate layer is coated with a second index of refraction that differs from the first index of refraction. Ultimately, the connecting layer is coated with a metallic, translucent layer, preferably by means of physical vapor deposition. Optionally, the metallic layer may be coated with a protective layer. The step of coating the connecting layer with a metallic, translucent layer is preferably carried out with the help of sputtering.

As a matter of course, the above-discussed preferred embodiments of the illuminant may be used also in the context of the method according to the disclosure.

Preferably, the step of providing a transparent substrate layer comprises the step of forming the decoupling structures in the form of, preferably cone-shaped, cavities on the first side of the substrate layer. Preferably, these cavities are formed with the help of a laser. Preferably, the cavities are formed on the first side of the substrate layer in a predetermined pattern and/or in different shapes and/or dimensions. To this end, the laser beam may be directed to the corresponding positions of the substrate layer by means of a suitable apparatus (e.g., galvanometer scanners). The dimensions of the cavities may be meticulously controlled by the laser intensity and/or exposure time. For instance, cones having diameters between 40 µm and 400 µm can be produced with conventional laser systems without difficulty. With the help of the arrangement and density of the cones, lettering, logos, or other structures can be produced.

In an analogous manner to the decoupling structures, one or more coupling structures may also be formed, which are suitable for coupling light into the substrate layer from outside. Cones with diameters of at least 100 µm, preferably at least 200 µm, and particularly preferably at least 300 µm are particularly preferred for this purpose.

The step of coating the first side of the substrate layer with a connecting layer is preferably carried out by applying a lacquer to the first side of the substrate layer and subsequent curing of the lacquer. Depending on the type of lacquer, the curing step can be carried out by means of drying, heating, or irradiating with, e.g., UV light.

The present disclosure provides an improved illuminant that can be produced with simple means and at low cost, satisfies the highest expectations with respect to aesthetics, and offers a range of new functions by being able to display information with the help of light on the one hand and achieving a homogeneous and, depending on the field of application, reflective appearance under daylight conditions on the other hand.

BRIEF DESCRIPTION OF THE DRAWINGS

In the following, preferred embodiments of the present disclosure are described in more detail with respect to the figures, wherein.

DETAILED DESCRIPTION OF THE PREFERRED EMBODIMENT

Figure 1:
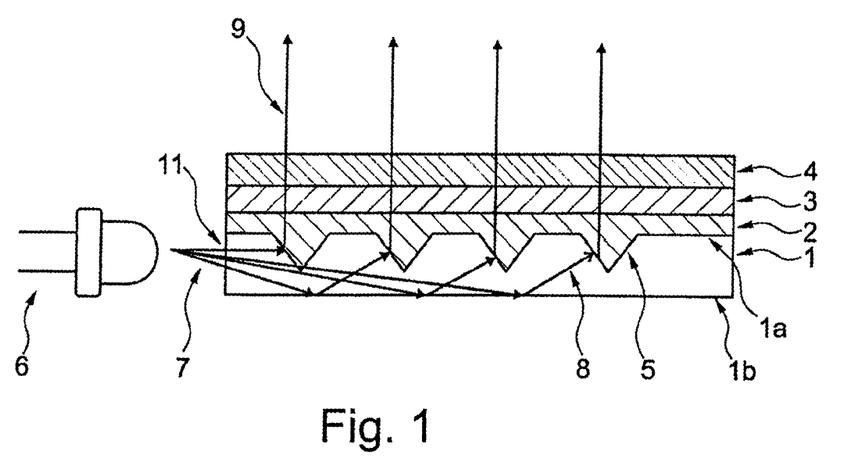
FIG. 1 shows a schematic cross-sectional view through an illuminant according to a preferred embodiment of the disclosure.

A preferred embodiment of the illuminant according to the present disclosure is shown in a schematic cross-sectional view of FIG. 1. The illuminant comprises a transparent substrate layer 1 with a first index of refraction, a connecting layer 2 with a second index of refraction that differs from the first index of refraction, and a metallic, translucent layer 3, wherein the connecting layer 2 is arranged between the substrate layer 1 and the metallic layer 3. The substrate layer 1 comprises a first side 1a facing the connecting layer 2, and a second, opposing side 1b. On the first side 1a, the substrate layer 1 comprises a plurality of decoupling structures 5 suitable for decoupling from the substrate layer 1 light 8 propagating within the substrate layer 1 in the direction towards the metallic layer 3.

In the illustrated preferred embodiment, the decoupling structures 5 are configured as cone-shaped cavities and/or recesses identical in dimension and shape. The cavities and/or recesses can, however, generally assume any different shape and be, e.g., pyramidal or prismatic. The cavities and/or recesses do not have to taper either, but can, e.g., rather be rounded off at their lower ends too. Further, decoupling structures of different shapes and dimensions can also be present. It is particularly preferred that the local density of the decoupling structures varies in order to be able to vary the exiting brightness in a controlled way.

The light 8 propagating within the substrate layer 1 enters the substrate layer 1 through one or more coupling structures 11. In the illustrated preferred embodiment, the coupling structure 11 is formed by a planar front end of the substrate layer 1. After the light 7 has been coupled into the substrate layer 1 by the coupling structure 11, the light is reflected totally (8) at the interface formed by the second side 1b of the substrate layer 1 and decoupled (9) at the decoupling structures 5. The light 9 decoupled from the decoupling structures 5 penetrates the transparent connecting layer 2 and the metallic, translucent layer 3. Due to the arrangement of the decoupling structures 5 in a predetermined pattern, the user discerns the exiting light 9 in the form of the pattern.

The coupled light 7 may be provided and/or produced by an external light source 6 such as, e.g., an external light-emitting diode. Alternatively, the light-emitting diode 6 could also be embedded in the front end of the substrate 1. In the case of a relatively large-scale substrate 1, it is preferred that light is being coupled into the substrate 1 from all sides, i.e., e.g., at all front ends of the substrate.

Optionally, a protective layer 4 may further be provided, which protects the metallic, translucent layer from damage on the one hand and which may be colored in order to affect the appearance of the illuminant on the other hand.

Figure 2:
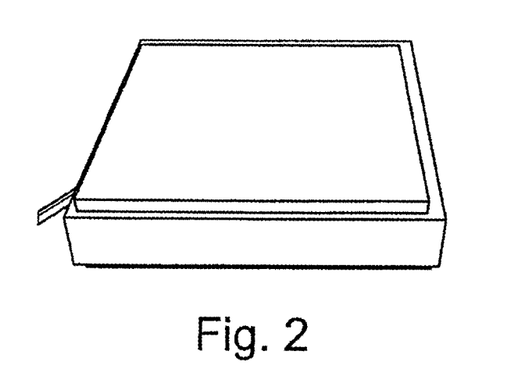
FIG. 2 shows a perspective schematic diagram of an illuminant according to a preferred embodiment of the disclosure under daylight conditions.
Figure 3:
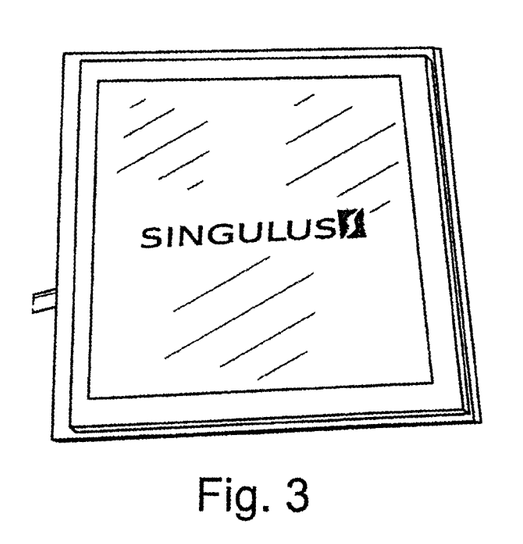
FIG. 3 shows a perspective schematic diagram of the illuminant according to FIG. 2 in a state in which light is being decoupled from the decoupling structures.

FIGS. 2 and 3 each show perspective schematic diagrams of a preferred embodiment of the illuminant according to the disclosure, once without coupling light (FIG. 2) and once with coupling light (FIG. 3). As can be seen in FIG. 2, the decoupling structures are not discernible to the naked eye when no light is being decoupled from the decoupling structures. Rather, the surface of the illuminant appears as a homogeneous layer with metallic luster and/or reflection. In contrast, when the ambient brightness is low and light is coupled (cf. FIG. 3), light decoupled from the decoupling structures is discernible to the naked eye through the metallic layer. In the illustrated preferred embodiment, the decoupling structures are configured such that they form the lettering "SINGULUS", which sharply and clearly identifiably stands out from the remaining surface of the illuminant.

Figure 4:
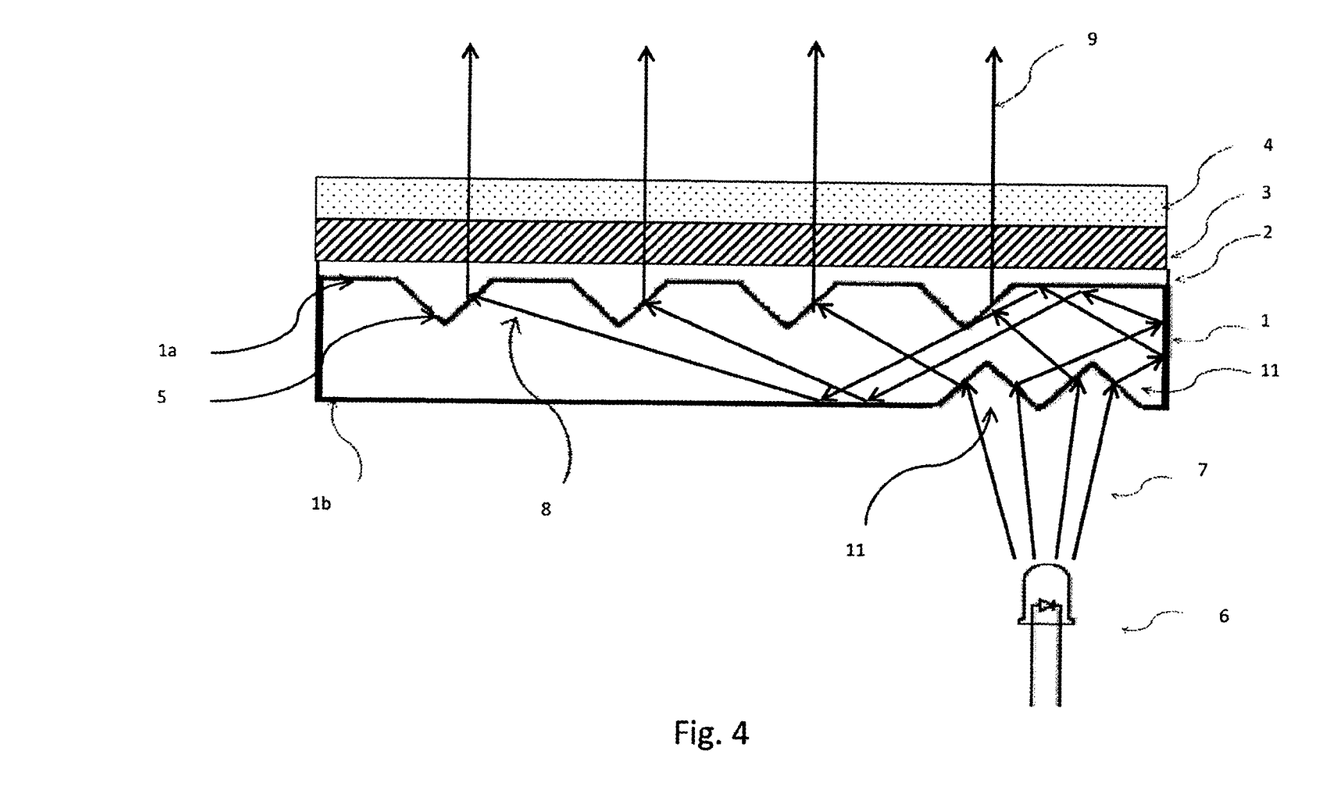
FIG. 4 shows a schematic cross-sectional view through an illuminant according to a preferred embodiment of the disclosure.

Another preferred embodiment of the illuminant according to the disclosure is shown in a schematic cross-sectional view in FIG. 4. The illuminant comprises a transparent substrate layer 1 with a first index of refraction, a connecting layer 2 with a second index of refraction that differs from the first index of refraction, and a metallic, translucent layer 3, wherein the connecting layer 2 is arranged between the substrate layer 1 and the metallic layer 3. The substrate layer 1 comprises a first side 1a facing to the connecting layer 2, and a second, opposing side 1b. On the first side 1a, the substrate layer 1 comprises a plurality of decoupling structures 5 suitable for decoupling from the substrate layer 1 light 8 propagating within the substrate layer 1 in the direction towards the metallic layer 3.

Contrary to the embodiment according to FIG. 1, the light 8 propagating within the substrate layer 1 in this embodiment enters the substrate layer 1 by one or more coupling structures 11 which are provided on the side 1b facing away from the connecting layer 2 in the form of, e.g., cone-shaped recesses. In this way, the light can be coupled into the substrate layer 1 from the side opposing the metallic, translucent layer 3. This is particularly advantageous when the illuminant forms a three-dimensional structure, e.g., with an interior space.

Figure 5:
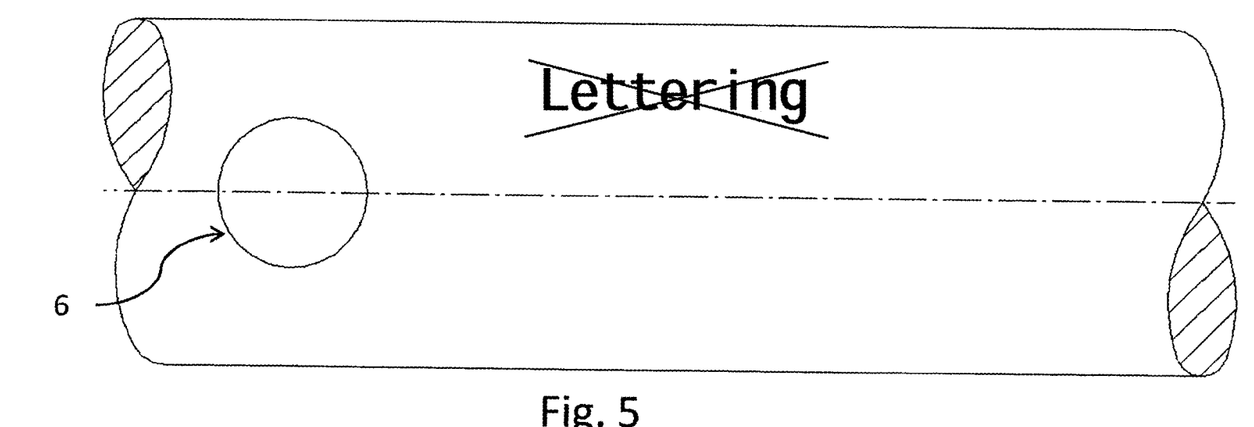
FIG. 5 shows a perspective schematic diagram of an illuminant according to a preferred embodiment of the disclosure under daylight conditions.
Figure 6:
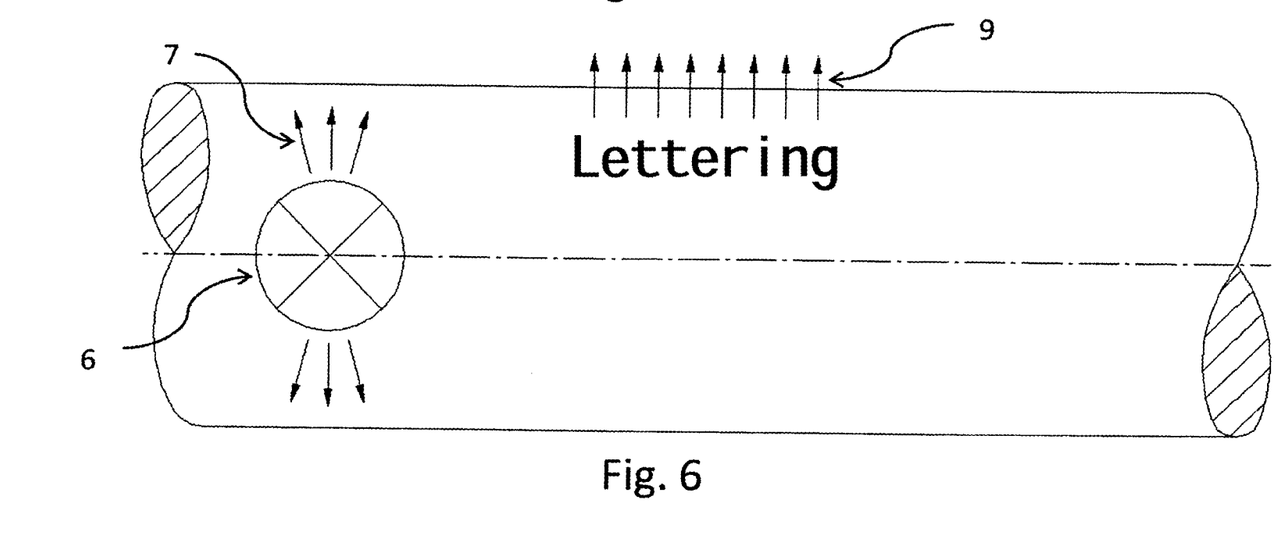
FIG. 6 shows a perspective schematic diagram of the illuminant according to FIG. 5 in a state in which light is being decoupled from the decoupling structures.

A preferred embodiment of such a three-dimensional illuminant with a light source arranged within the interior space is shown in the schematic diagrams of FIGS. 5 and 6 in which the structure illustrated in FIG. 4 has been formed to a cylindrical illuminant with a light source 6 arranged in its interior space, said light source 6 being once switched off so that no light is being coupled (FIG. 5) and once switched on so that light is being coupled (FIG. 6). As can be taken from FIG. 5, the decoupling structures are not discernible to the naked eye when no light is being decoupled from the decoupling structures, which is to be symbolized by the crossed out "Lettering". In fact, only a homogeneous surface can be seen here so that the decoupling structures forming the word "Lettering" are not discernible at all. Rather, the surface of the cylindrically shaped illuminant appears as a homogeneous surface with a metallic luster and/or reflection. In contrast, when the ambient brightness is low and light is coupled (cf. FIG. 6), light decoupled from the decoupling structures is discernible to the naked eye through the metallic layer. In the illustrated preferred embodiment, the decoupling structures are arranged such that they form the lettering "Lettering", which in the case of FIG. 6 sharply and clearly identifiably stands out from the remaining surface of the illuminant.

Figure 7:
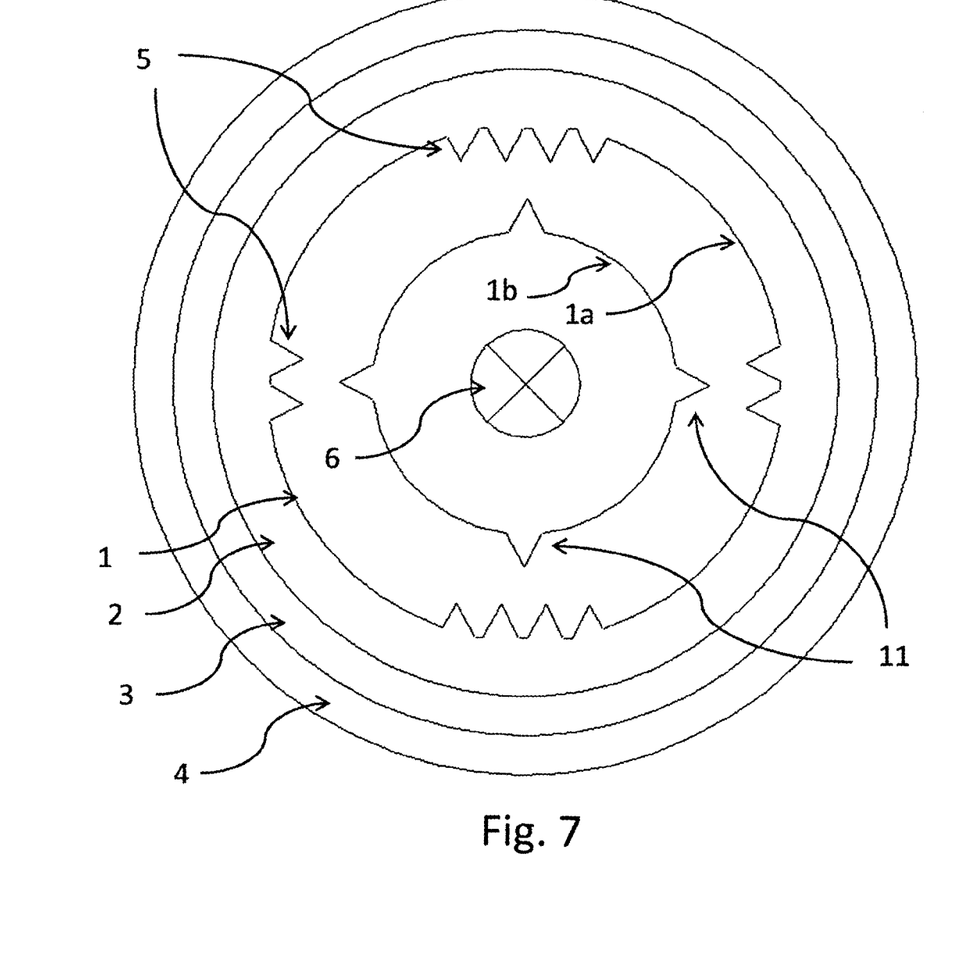
FIG. 7 shows a schematic cross-sectional view through the illuminant according to the disclosure and according to FIGS. 5 and 6.

FIG. 7 shows a schematic cross-sectional view through the illuminant according to the disclosure according to FIGS. 5 and 6. As can clearly be seen, in the case of the embodiment according to FIGS. 5-7 the structure illustrated in FIG. 4 has been formed to a cylindrical illuminant, in the interior space of which a light source 6 is arranged. In this context, the transparent substrate layer 1 with a first index of refraction is located in the inside and forms the interior space containing the light source. The connecting layer 2 with a second index of refraction that differs from the first index of refraction, the metallic, translucent layer 3, and the optional protective layer 4 are arranged on top thereof in this order. The substrate layer 1 comprises a first side 1a facing the connecting layer 2, and a second, opposing side 1b. On the first side 1a, the substrate layer 1 comprises a plurality of decoupling structures 5 suitable for decoupling from the substrate layer 1 light 8 propagating within the substrate layer 1 in the direction towards the metallic layer 3. In the illustrated embodiment, four groups of such decoupling structures 5 are each arranged at a distance of approximately 90°.

However, more or less of such groups of decoupling structures 5 may also be provided. Preferably, the decoupling structures extend over the whole circumference of the curved substrate layer 1 in order to achieve utmost homogeneous illumination of the complete illuminant. It is, however, also preferred to illuminate only certain regions homogeneously or non-homogeneously in order to illuminate, e.g., symbols or letterings locally.

In this embodiment, the light propagating within the substrate layer 1 enters the substrate layer 1 from the interior space containing the light source 6 through one or more coupling structures 11, which are provided in the form of, e.g., cone-shaped recesses on the side 1b facing away from the connecting layer 2. In the illustrated embodiment, four single coupling structures 11 are each arranged at a distance of approximately 90°. However, more or less coupling structures 11 may also be provided, which may also be arranged in groups like the decoupling structures. Preferably, also the coupling structures extend over the complete circumference of the curved substrate layer 1 in order to achieve utmost homogeneous illumination of the complete illuminant. It is, however, also preferred to illuminate only certain regions homogeneously or non-homogeneously in order to illuminate, e.g., symbols or letterings locally.

As a matter of fact, FIG. 7 is to be understood only exemplarily. The coupling and decoupling structures may be arranged completely different too. In particular, neither is it required to arrange the coupling and decoupling structures in an opposing manner nor is it mandatory to provide a symmetric arrangement thereof.

What is claimed is:

1. An illuminant comprising:
    a transparent substrate layer with a first index of refraction;
    a connecting layer with a second index of refraction that differs from the first index of refraction; and
    a metallic, translucent layer;
    wherein the connecting layer is arranged between the substrate layer and the metallic layer, and wherein the substrate layer comprises a plurality of decoupling structures on the side facing the connecting layer, said decoupling structures being suitable for decoupling light that propagates within the substrate layer from the substrate layer in the direction towards the metallic layer.

2. The illuminant according to claim 1, further comprising a protective layer applied to the metallic layer.

3. The illuminant according to claim 1, wherein the substrate layer comprises at least one coupling structure suitable for coupling light into the substrate layer from outside.

4. The illuminant according to claim 3, wherein one or more front ends of the substrate layer serve as (a) coupling structure(s).

5. The illuminant according to claim 3, wherein the substrate layer comprises at least one coupling structure, which is arranged on the side facing away from the connecting layer.

6. The illuminant according to claim 1, wherein the first and second indexes of refraction differ by at least 0.02.

7. The illuminant according to claim 1, wherein the decoupling structures are formed as cavities within the substrate layer.

8. The illuminant according to claim 7, wherein the cavities are at least partially filled with the material of the connecting layer.

9. The illuminant according to claim 8, wherein the cavities are completely filled with the material of the connecting layer, and the interface between the connecting layer and the metallic, translucent layer is smooth.

10. The illuminant according to claim 1, wherein the decoupling structures are not discernible to the naked eye when no light is being decoupled from the decoupling structures, and wherein light decoupled from the decoupling structures is discernible to the naked eye through the metallic layer.

11. The illuminant according to claim 1, wherein the transparent substrate layer, the connecting layer and the metallic, translucent layer are curved at least in sections.

12. The illuminant according to claim 11, wherein the radius of curvature of the circle of curvature of the curved section of the metallic, translucent layer is at least in sections smaller than 1 m.

13. The illuminant according to claim 1, wherein the transparent substrate layer at least in sections defines an interior space.

14. The illuminant according to claim 13, wherein the substrate layer comprises a plurality of coupling structures arranged on the side facing away from the connecting layer and suitable for coupling light into the substrate layer from the interior space.

15. The illuminant according to claim 13, further comprising a light source arranged within the interior space.

16. A packaging or container comprising an illuminant according to claim 1, wherein at least one outer surface of the packaging or the container comprises the illuminant or is formed by the illuminant.

17. The packaging or container according to claim 16, further comprising a light source suitable for coupling light into the substrate layer of the illuminant.

18. A method for producing an illuminant comprising:
   providing a transparent substrate layer with a first index of refraction, wherein on a first side the substrate layer comprises a plurality of decoupling structures suitable for decoupling light that propagates within the substrate layer from the substrate layer;
   coating the first side of the substrate layer with a connecting layer having a second index of refraction that differs from the first index of refraction;
   coating the connecting layer with a metallic, translucent layer by way of physical vapor deposition.

19. The method according to claim 18, further comprising the step of coating the metallic layer with a protective layer.

20. The method according to claim 18, wherein the step of coating the connecting layer with a metallic, translucent layer is carried out by means of sputtering.

21. The method according to claim 18, wherein the step of providing a transparent substrate layer comprises the step of forming the decoupling structures in the form of cavities on the first side of the substrate layer.

22. The method according to claim 21, wherein the cavities are being formed with the help of a laser.

23. The method according to claim 21, wherein the cavities are being formed on the first side of the substrate layer in a predetermined pattern, and/or wherein cavities of different shapes and/or dimensions are formed.

* * * * *